United States Patent

Rosenberg

[11] Patent Number: 5,924,692
[45] Date of Patent: Jul. 20, 1999

[54] MULTI-STABLE MECHANICAL DEVICE EMPLOYING COMPACTED RODS OR DISKS

[76] Inventor: Bruce Lamar Rosenberg, 23 N. Chelsea Ave., Atlantic City, N.J. 08401

[21] Appl. No.: 08/901,567

[22] Filed: Jul. 28, 1997

[51] Int. Cl.[6] ........................................................ A63F 9/00
[52] U.S. Cl. ................................... 273/153 S; 273/153 R
[58] Field of Search .......................... 273/153 R, 153 S, 273/157 R; 40/90 S; 401/131, 49; 206/214

[56] References Cited

U.S. PATENT DOCUMENTS

| 132,562 | 10/1872 | Cleveland | 206/214 |
| 1,257,432 | 2/1918 | Wetzel | 273/157 R |
| 1,709,660 | 4/1929 | De Bracht | 273/157 R |
| 2,913,789 | 11/1959 | Loredo | 401/131 |
| 3,026,847 | 3/1962 | Anderson, Jr. | 40/905 |
| 3,201,894 | 8/1965 | Resch | 273/157 R |

*Primary Examiner*—Steven Wong

[57] ABSTRACT

This invention is a multi-stable mechanical device. It is a bundle of rods surrounded by elastic, which when manipulated can be made to change from one stable close-packed state to another, causing a sudden rearrangement of the rods within the bundle, and producing a snapping noise or click which can be heard and felt with the fingers, and interesting visual effects due to the rearrangement of the rods. Possible applications of this invention are amusement devices, puzzles, science education, toys, executive pacifiers, hand exercisers, and physics and materials science demonstrations.

2 Claims, 2 Drawing Sheets

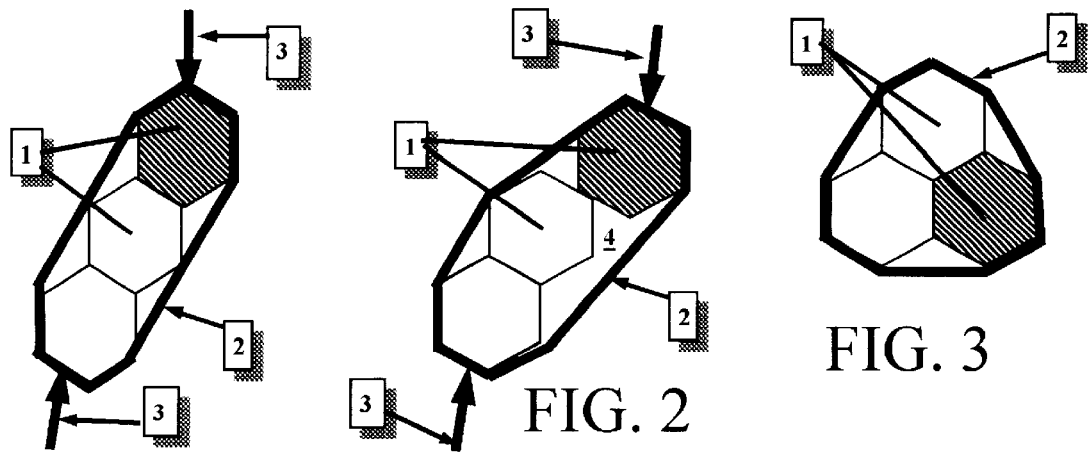
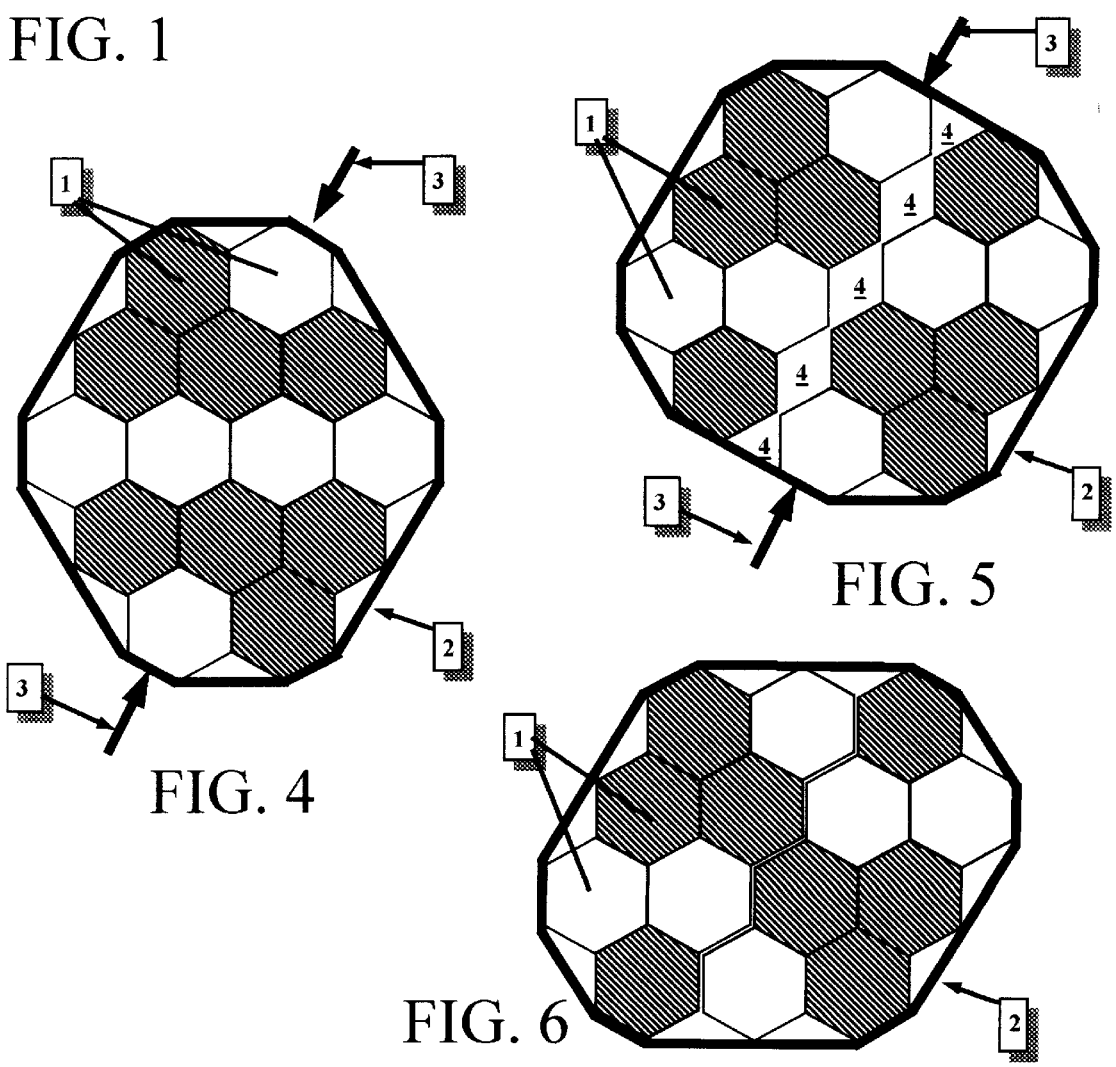

MULTI-STABLE MECHANICAL DEVICE EMPLOYING COMPACTED RODS OR DISKS

BACKGROUND OF THE INVENTION

1. Field of the Invention

This invention relates to mechanical devices containing a plurality of rigid elements wherein a centrally-acting elastic containing means causes compaction and mutual constraint among the elements, allowing the existence of a number of possible, stable configurations of the elements. Alteration of force and direction of force upon the centrally-acting elastic containing means can overcome an energy barrier and result in a rearrangement of the elements from one stable configuration into another.

2. Statement of the Prior Art

Osborne Reynolds first described volumetric dilatancy in Reynolds, O., "On the Dilatancy of Media Composed of Rigid Particles in Contact" *Philosophical Magazine*, 20 (S5), pp. 469–481, December 1885. In this article Reynolds describes the enclosing of a mass of solid particles or balls inside an elastic, closed envelope (latex balloon). Volumetric dilatancy is the tendency of a granular medium to expand upon shear. It has more recently been called a "locking solid". This behavior can be most easily understood by the change that occurs when the plastic envelope of a vacuum-packed package of coffee is pierced. What was a solid, hard block of compressed coffee granules suddenly becomes a loose, pliable bag of free flowing granules.

Subsequently, Reynolds developed a theory of the structure of space, gravity, and electro-magnetism in which volumetric dilatancy played an essential part: Reynolds, O., Papers on Mechanical and Physical Subjects, Vol. III, *The Submechanics of the Universe*, Cambridge: at the University Press, 1903. and Reynolds, O., *On an Inversion of Ideas as to the Structure of the Universe* (The Rede Lecture, Jun. 10, 1902), Cambridge: at the University Press, 1903. In these documents, among much else, Reynolds explains light waves as transverse vibrations in a mechanical, granular medium (or aether) caused by "reversions of complex inequalities", i.e., by a snapping back of grains into close packing, an action which is made audible and tactual in the subject invention.

The previously described volumetric dilatant devices of Reynolds, while capable of producing a locking solid, use a plurality of uniform, near-spherical grains, not rods nor disks as taught herein. In addition, herein, the visibility of the ends of the elements allows changes in their relative positions and groupings to be seen.

Examples of patents teaching compact bundle formation of elongated elements are found in U.S. Pat. No. 3,956,982 to Hill and Wynn, issued May 18, 1976 and U.S. Pat. No. 4,174,662 to Klusmier, issued Nov. 20, 1979. These patents describe devices to facilitate the assembly and fastening of bundles into a stable, unchanging configuration and do not deal with the dynamic and geometric properties of rearrangements of elements within the bundle as in the subject invention.

A theoretical physics approach is taken to mathematically describing arrangements of compacted finite systems of rigid elements in Stillinger, F. H. Jr. and Salzburg, Z. W., "Limiting Polytope Geometry for Rigid Rods, Disks, and Spheres", pp. 179–225, *Journal of Statistical Physics*, Vol. 1, No. 1, 1969. A polytope is the "limiting high-compression region" of a finite system of rods, disks or spheres. The subject invention provides a method for physically modeling and visually and tactually exploring the theoretical results for the 2-dimensional rod and disk examples of Stillinger and Salzburg; but is in no way disclosed by their article.

It is believed that the subject invention is a novel way of implementing a multi-stable mechanical device with minimal means, inexpensively and effectively.

SUMMARY OF THE INVENTION

The present invention relates to amusement devices, puzzles, science education, toys, executive pacifiers, hand exercisers, and materials science demonstrations. The mechanism is a multi-stable mechanical device. It is a bundle of rods contained by elastic, which when manipulated can be made to change from one stable close-packed arrangement to another, overcoming an energy barrier, causing a sudden rearrangement of the rods within the bundle, and producing a snapping noise or click which can be heard and felt with the fingers, and interesting visual effects due to the rearrangement of differently colored rods.

BRIEF DESCRIPTION OF THE DRAWINGS

FIG. 1 is an end view of the simplest, nontrivial polytope showing the ends of three hexagonal rods or disks arranged in a straight line and the centrally-acting elastic containing means. FIG. 2 is the same polytope as FIG. 1 but showing movement of one rod due to applied pressure. FIG. 3 is the final arrangement of the three rods, now in a triangular configuration. In like manner, FIGS. 4, 5, and 6 show three stages in the rearrangement of a more complex polytope consisting of 14 hexagonal rods.

DESCRIPTION OF PREFERRED EMBODIMENTS

Figure 7:
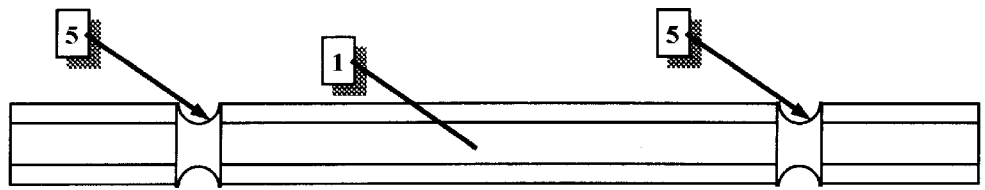
FIG. 7 shows a side view of one of the possible hexagonal rod elements with two circumferential grooves.

FIG. 1 is an end view of the simplest, nontrivial polytope showing the ends (or cross-sections) of three hexagonal rods or disks 1 arranged in a straight line and the centrally-acting elastic containing means 2. As shown here the polytope is in a stable configuration with its centrally-acting elastic containing means 2 stretched more than in FIG. 3, but less than in FIG. 2. FIG. 2 shows movement of one rod due to applied compression or shearing stress in the directions of the heavy arrows 3. To move from the stable configuration of FIG. 1 to the more stable configuration of FIG. 3 an energy barrier must be overcome. One of the stages in this dynamic process is shown in FIG. 2. In overcoming the energy barrier, the centrally-acting elastic containing means is stretched and increased inter-rod area 4 is created as shown in FIG. 2. This increased interstice space 4 is necessary to allow the rods to slide over one another and assume another configuration. FIG. 3 is the final arrangement of the three rods 1, now in the most stable, compacted triangular configuration with the centrally-acting elastic containing means 2 stretched least. This example is not a preferred embodiment; but is shown to illustrate the principle in the simplest possible manner.

In like manner, FIGS. 4, 5, and 6 show three stages in the rearrangement of a more complex polytope consisting of 14 hexagonal rods. FIG. 4 is an end view of the more complex polytope showing the ends (or cross-sections) of 14 hexagonal rods or disks 1 arranged in a minimal energy configuration and the centrally-acting elastic containing means 2. The less tension there is in the elastic containing means the lower the total energy of the system and the higher the stability of the configuration. As shown in FIG. 4 the polytope is in a stable configuration with its centrally-acting elastic containing means 2 stretched the same amount as in FIG. 6, but less than in FIG. 5.

FIG. 5 shows movement of a group of 7 rods relative to a group of another 7 rods due to applied compression or squeeze in the directions of the heavy arrows 3. To move from the stable configuration of FIG. 4 to the stable configuration of FIG. 6, an energy barrier must be overcome. The stage of maximal resistance to this dynamic process of deformation is shown in FIG. 5. In overcoming the energy barrier, the centrally-acting elastic containing means 2 is stretched and increased inter-rod areas 4 are created as shown in FIG. 5. These increased interstice spaces 4 are necessary to allow the two groups of rods to slide past each other and assume another configuration. FIG. 6 shows the final arrangement of the fourteen rods 1, now in a different, stable compacted configuration.

Figure 8:
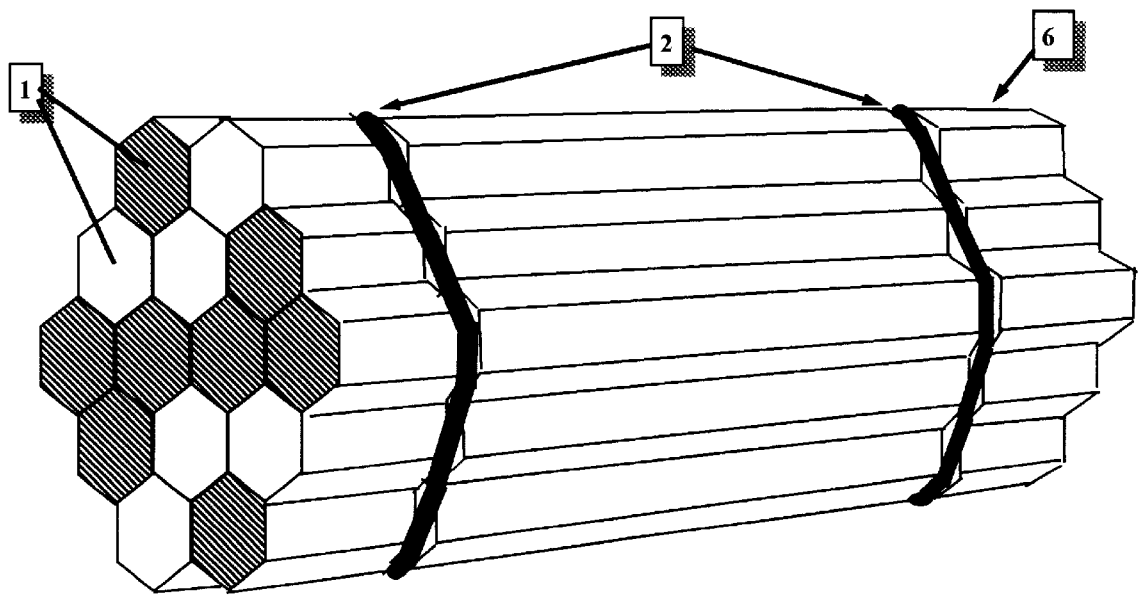
FIG. 8 shows a perspective view of a bundle of fourteen rods.
Figure 9:
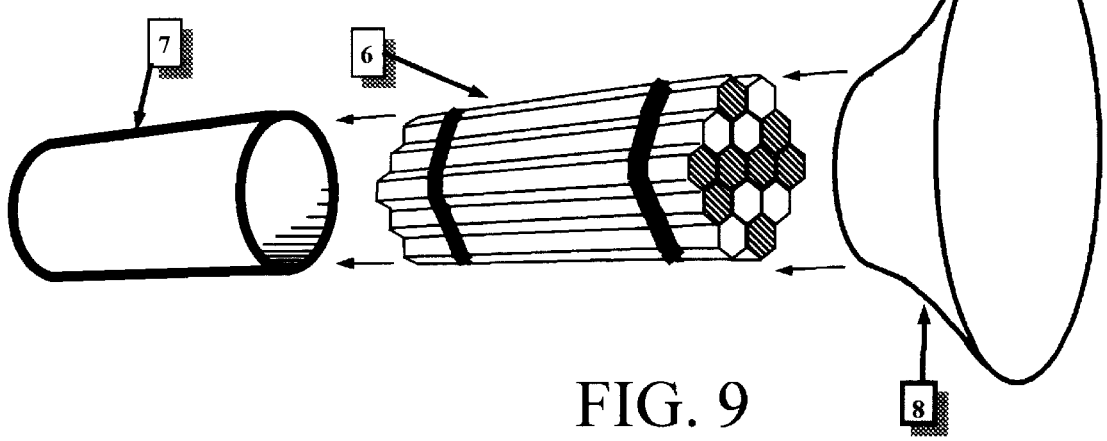
FIG. 9 shows a perspective view of a toy employing an acoustic horn to amplify the snapping sound from the sudden reversion of the elements from one close-packed state to another.

FIG. 7 shows a side view of one of the possible hexagonal rod elements 1 with two circumferential grooves 5. The grooves are milled into all the elements in the bundle. FIG. 8 shows a perspective view of a bundle 6 of fourteen rods and an elastic band or "O" ring fitting into the aligned circumferential grooves of the rod elements. FIG. 9 shows a perspective view of a toy encasing the bundle 6 in an elastic cup 7 that holds and constrains the bundle 6 and directs the acoustic energy of the sound through an attached acoustic horn 8. This amplifies the snapping sound from the sudden rearrangement of the elements.

A bundle of 14 identical elongated rigid elements, each weighing 0.1 ounce, 4 inches long of hexagonal cross-section 0.25 inches across, held tightly on each end by elastic constraining means each having a spring constant of 7 pounds per inch deflection is one preferred embodiment of this invention. This spring constant can be exerted by one typical medium rubber band 6 to 7 inches in circumference, 1/8 inch wide, and 3/64 inch thick that is doubled twice to give 4 parallel strands stretched around the bundle. Two rubber bands are used, one near each end. A force on the order of 1 to 4 pounds applied with the fingers and thumb is necessary to cause the rearrangement of elements and consequent snapping action. The amount of shearing stress or force necessary depends upon the elastic spring constant and the friction among the elements. With this preferred embodiment, rod elements of low surface friction, sufficiently strong centrally-acting elastic containing means, and shearing pressure applied in the proper location and direction, the transition from the configuration shown in FIG. 4 to that in FIG. 5 occurs in approximately 0.2 to 0.4 seconds depending on the rapidity of the person's squeeze. During this phase, the stretching of the elastic containing means resists the person's effort. The person's work or energy input is necessary to surmount the energy barrier thus forcing the bundle to change to another stable configuration. The state shown in FIG. 5 represents the peak of the energy barrier to deformation. During the transition from the state shown in FIG. 5 to the final state in FIG. 6 the elastic containing means assists the person's effort, automatically compressing the separated elements into a compact, close-packed bundle. This happens extremely rapidly (in less than $1/500^{th}$ of a second) and produces a snapping sound and a clicking tactile feel. This snapping effect is analogous to Osborne Reynolds' light wave production caused by "reversion of complex inequalities" as cited as prior art.

As shown by the difference between FIG. 4 and FIG. 6, the visual effect of the rearrangement of the faces of the rods is also interesting. Rod elements 1 of two or more different colors could be bundled together such that the relative positions of the (say, black and white) rod faces could represent alphanumeric symbols or other recognizable patterns. With each snap of the bundle, the patterns change. A game could be played to manipulate the bundle, rearranging the rods and produce as many recognizable symbols as possible in a given time period.

The snapping sound arises from rapid collision of the separated elements when they revert to a close-packed state. The speed of this reversion is determined by the strength of the elastic containing means, the friction between the elements, and the mass of the elements. The snapping sound emanates primarily from both ends of the bundle. If the bundle is contained in a stretched elastic cup 7, an increased sound pressure is forced to emanate from the open end. If an acoustic horn 8 is added to the open end, the loudness of the snapping sound can be further increased. This arrangement would be useful for a toy noisemaker.

It is to be understood that polytopes with other numbers of elements may show even more interesting behavior than the fourteen-tope described above and shown in the drawings and that the embodiments described above are illustrative and not limiting, with the scope of the invention being defined in the claims which follow.

What is claimed is:

1. A multi-stable mechanical device comprising a plurality of extended rigid elements wherein a surrounding centrally-acting elastic containing cup causes compaction and mutual constraint among the elements, thereby forming a bundle which can assume multiple stable configurations, wherein sufficient compressive force on the perimeter of said bundle in appropriate spots results in relative motion among the elements, stretching the centrally-acting elastic containing cup and causing a rapid mechanical rearrangement of said elements from one stable, close-packed state to another, further wherein the narrow end of an acoustic horn is affixed to the open end of said elastic containing cup, producing a loud snapping sound and educational, entertaining, and healthful visual, tactile, auditory, and therapeutic exercise effects.

2. A multi-stable mechanical device composed of a compact bundle of identically shaped, identically sized rods of hexagonal cross section, held together by an elastic cup stretched around the perimeter of the bundle such that when sufficient compressive force is exerted on appropriate spots on the perimeter of the bundle, a rapid shift in the relative positions of the rods from one close-packed state to another occurs, further wherein the narrow end of an acoustic horn is affixed to the open end of said elastic cup, producing a loud snapping sound and educational, entertaining, and healthful visual, tactile, auditory, and therapeutic exercise effects.

* * * * *